Feb. 11, 1958   B. W. POWER   2,823,131
FOOD SPOILAGE INDICATOR
Filed June 17, 1954

INVENTOR.
BRUCE WILLIAM POWER
BY
ATTORNEY

2,823,131

FOOD SPOILAGE INDICATOR

Bruce W. Power, San Isidro, Lima, Peru

Application June 17, 1954, Serial No. 437,399

3 Claims. (Cl. 99—192)

It is increasingly the practice in the food industry to pack perishable food products in their fresh condition but without sterilization and then to freeze the same and keep them frozen until they are ultimately consumed. This is a very desirable process because it eliminates the cost of canning in metal or glass containers, because it eliminates the necessity of adding preservative chemicals and because it preserves the original freshness and flavor.

However, due to mechanical failure or neglect, food products thus preserved are sometimes allowed to thaw out to a point where the flavor is affected or to a point where they become dangerous for human consumption, and then are re-frozen and sold to the consumers who have no way of knowing that the products they are buying have been re-frozen and are either undesirable or dangerous.

It is therefore one object of the invention to produce means for automatically indicating to the purchaser that the packed food product in question had been allowed to thaw out and had been re-frozen.

Food products, especially those which are perishable such as shrimp, fish, oysters and other meats, are initially cooled well below the freezing point so that they store up a great amount of latent cold or negative temperature and therefore such foods will take various lengths of time before they will thaw out depending on the nature of the products, on the manner in which they are packaged, on the temperature to which they are subjected, on the length of time to which the food products are subjected to such temperature, and on the degree to which their temperature was lowered in the initial freezing. Also, various foods have various spoilage characteristics. For example, oysters will spoil much more rapidly than fish, and fish will spoil much more rapidly than beef, and so on. This being, the case, and because of the initial "deep" freezing, such products can when allowed to thaw out during transportation or due to power failure, or oversight, and can be safely re-frozen, provided they were not subjected to high temperature for a period of time sufficient to produce any adverse effect.

It is therefore a further object of the invention to produce a delayed action or time-controlled indicating device which will indicate not merely that the food product had thawed out and had been re-frozen but that the food product in question had been subjected to such temperature, for such a length of time, as to adversely affect the quality of the product or so as to make it unfit for consumption.

A still further object is to produce an indicating device which includes no moving parts and which is initially prepared so as to have the desired time delay without the need of any adjustment of the device itself.

A still further object is to produce an indicating device the message of which can be noted and interpreted by an average housewife whose knowledge of matters scientific is limited or non-existent. In other words, my device is such that its message can be understood by anyone who can distinguish one color from another and without any knowledge of the natural principles involved and without any ability to read thermometers, charts or other instruments.

A still further object is to produce an indicating device of the type set forth which will not materially add to the bulk, the weight or the cost of the packaged food product to which it may be applied.

A still further object is to produce an indicating device of the type set forth which is non-toxic and which, though non-toxic, does not come in contact with and therefore can not contaminate the food product itself.

These and other objects are attained by my invention as set forth in the following specification as shown in the accompanying drawing in which.

Figure 1:
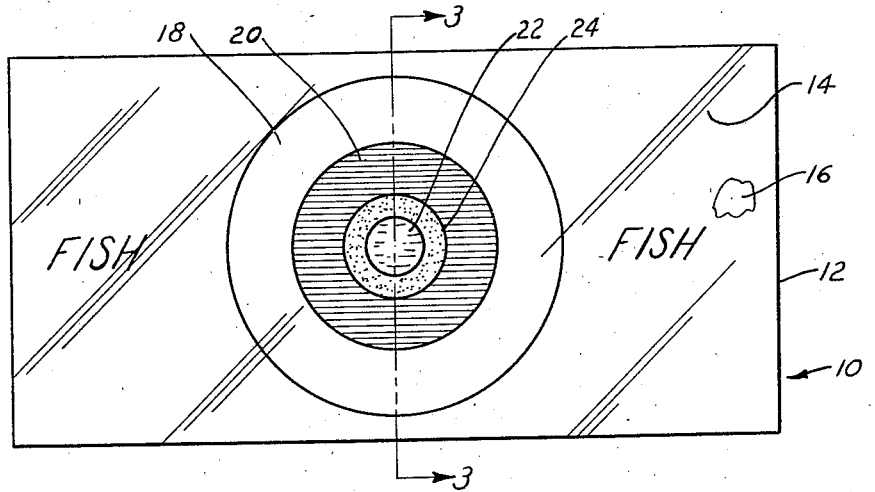
Fig. 1 is a top plan view of one embodiment of my food spoilage indicating device, the same being shown as it appears when the food product to which it is applied is "safe" or fit for use.

In the embodiment illustrated, 10 is a receptacle containing a perishable food product which has been "deep" frozen. The receptacle itself is usually made of waxed paper 12 and is wrapped in water and air tight, transparent sheet material 14. The container 10 and the outer wrapper 14 form no part of this invention and may be made of any desired material it being only necessary for the purpose of my invention, that the outer wrapper 14 be transparent, or at least translucent.

To carry out the invention, I place my indicating device between the wrapper 14 and the side 16 of the package which is most readily visible when the package is on display. This usually is the top side where the name of the product, the name of its manufacturer and other information is placed.

The indicating device itself includes supporting body member 18, a color changing element 20 carried by said body member, a breakable capsule 22, or the like, containing a reagent which on contact with element 20 will change its color, and a time-delay element 24 interposed between the reagent containing capsule 22 and the color changing element 20 to guard against premature or unwarranted indication of spoilage.

The body member 18 may be made of any desired material and any desired shape or size, the only requirement being that it shall be strong enough to support the remaining elements of the indicating device pending its application to a packaged food product. The supporting body member is also preferably one on which certain indicating can be displayed as hereinafter more fully set forth.

The color changing element 20 is preferably a piece of blue litmus paper which turns red on contact with an acid.

The reagent contained in capsule 22 is preferably an aqueous solution of citric acid, acetic acid or any other non-corrosive, non-toxic acid which, on contact with the litmus paper will turn it from blue to red.

The re-agent is contained in a capsule made of glass or the like which will break when the acidic solution freezes.

The time delay element 24 is in the nature of an outer covering or coating which is made of a gelatin which is soluble in water having a pH value of less than seven. Such water soluble gelatin capsule is available on the market and are extensively used for conveying cod liver oil and other chemicals to the stomach.

The blue litmus 20 may be pasted to the top of supporting disc or, as shown in the drawing, it may be in the form of a disc fitted in a cut out formed in the supporting disc. The outer gelatin capsule 24 is suitably secured to the outer side of the litmus paper and completely envelops the capsule 22 which is filled with the appropriate re-agent such as 1% aqueous acidic solution.

Figure 2:
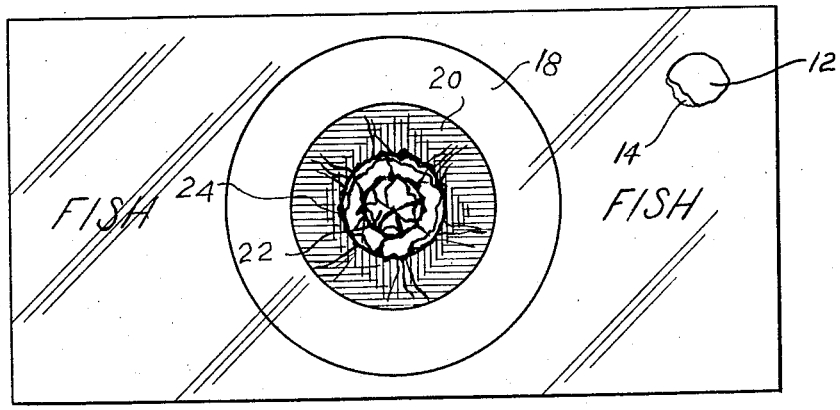
Fig. 2 is similar to Fig. 1 but showing the indicating device as it appears when the food product to which it is applied is unfit for use.

The operation is as follows:

The food product is packed into receptacle 10 and the disc 18 carrying the litmus paper 20 with capsule 24 containing capsule 22 secured thereto is placed on the outer side 16 of the top 12 of the container. The container is then subjected to very cold temperature to freeze the same. This hard freezing breaks the glass capsule 22 but since the acidic solution is itself frozen solid, it can not react with capsule 24. When, however the package is subjected to a temperature such as to melt the acidic solution, the solution will dissolve the gelatin capsule 24 and will come into contact with the blue litmus paper and will cause it to turn red as shown in Fig. 2. This will indicate to the client that the food product had thawed out to an undesirable, or dangerous extent and had been re-frozen.

The operation of the device is shown in exaggerated fashion in Fig. 2 in which inner capsule 22 is shown broken up, outer capsule 24 is shown dissolved in various places and the central portion of litmus paper is shown red in a more or less irregular pattern. Given sufficient time and sufficient acid, the entire area of the litmus paper will turn red but, for purposes of illustration and contrast, the litmus paper is shown as only partly affected by the acid.

Figure 3:
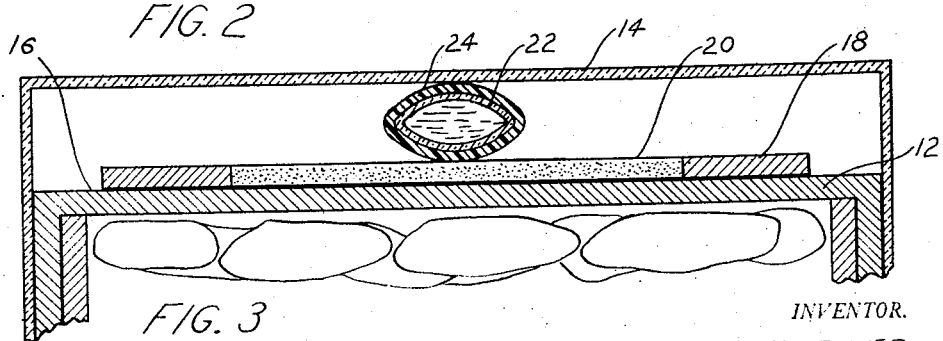
Fig. 3 is an enlarged and fragmentary sectional view on line 3—3 on Fig. 1, showing details of construction.

Also, in Fig. 3 the parts have been greatly exaggerated but in practice the capsules 22 and 24 are much smaller and wrapper 14 is not spaced from the top of the box as much, nor in the manner graphically illustrated in Fig. 3.

In order to appraise the prospective purchaser of the fact, that the food is undesirable, or dangerous, a suitable warning is inscribed on the portion of the disc surrounding the litmus paper. For example, "do not buy it if center disc is red" or words to that effect can be employed.

It will be noted that because of the extreme loss of latent heat of a deep-frozen package, it will take considerable time for the frozen acidic solution to melt and it will also take additional time for the liquid-acidic solution to dissolve the time-delay outer gelatinous capsule. Therefore, if the product is re-frozen before the acidic solution has reached the litmus paper, there will be no indication that the product had experienced a rise in temperature and this is as it should be because any rise in temperature which is not enough to permit the acidic solution to reach the litmus paper is also not enough to damage the food product itself.

For use in conection with foods having a high coefficient of spoilage, the wall of the gelatine capsule can be made thinner and the amount of acidic solution can be increased and vice versa. For still more rapid action, the time delay gelatine capsule may be omitted. In this case capsule 22 will rest directly on the litmus paper so that as soon as the acidic solution melts it will affect the litmus paper.

If desired, the litmus paper can be used to spell a warning such as "spoiled" and if the supporting disc is also blue, the warning will not be visible until the acid has reached the litmus paper and turned it red. This arrangement will produce a red warning which is easily seen.

Capsule 24 may be also made of acid-soluble materials such as plastics, resins, waxes, or animal oils or fats. In this case the nature of the material, the thickness of the wall of the capsule, and the strength and amount of acid, or any of these factors may be used to provide the desired time control.

Capsule 24 may be also made of materials which have different melting points so as to hasten or delay the access of the acidic solution to the litmus paper regardless of the solubility, or non-solubility, of the material of the time delay capsule in water or its re-action, or non-reaction, with the acid. For example, a capsule made of a high melting point material will retard the arrival of the acidic solution at the litmus paper and vice versa. Such capsules may be made from almond, olive or whale oil or from bees wax, carnauba wax or any combination of any of these or similar substances.

In practice, the capsules 22 are mass-produced and are then coated with gelatin, or placed inside of a gelatin capsule, as desired and the outer gelatin capsule is attached to the litmus paper which in turn is carried by disc 18 or its equivalent, or by the top 12 of the container itself. The detecting device as a unit, is then placed on the top of the container so as to be enveloped by the outer transparent wrapper 14. Deep freezing of the food products smashes the inner capsule 22 and sets or triggers the device for action in the manner above described.

If desired, capsule 22 may be omitted and the acid can be injected into capsule 24 immediately before freezing so that the acid will solidify before the gelatine capsule is dissolved. In this case, the amount of acid injected will be less than the volumetric capacity of the capsule 24 so that the capsule will not break upon freezing of the acid.

What I claim is:

1. A food spoilage detecting device including an element adapted to change its color upon contact with a given re-agent, a breakable capsule containing an aqueous solution of such re-agent and associated with said element, means attaching said element and said capsule to a food package, whereby, upon freezing of said food package, said aqueous solution will also freeze and break said capsule and whereby, subjecting said package to temperature sufficient to thaw out its contents will also liquify said re-agent and allow to come into contact with, and to change the color, of said element, and a water soluble coating enclosing said capsule for delaying the contact of said re-agent for the period of time necessary to dissolve said coating after the liquefication of said re-agent, the composition and thickness of said coating being such that the time needed for liquefication of said coating is less than the time needed for spoilage of the food to set in.

2. The structure recited in claim 1 in which said coating is an edible acid-soluble coating enclosing said capsule.

3. The structure recited in claim 1 in which said detecting device is placed in a package having a transparent wall and said element is in the form of a sheet visible through said wall with said capsule contacting said sheet.

References Cited in the file of this patent

UNITED STATES PATENTS

| | | |
|---|---|---|
| 2,460,215 | Chase | Jan. 25, 1949 |
| 2,560,537 | Andersen | July 17, 1951 |
| 2,662,018 | Smith | Dec. 8, 1953 |